United States Patent [19]

Starck et al.

[11] 4,013,827
[45] Mar. 22, 1977

[54] PROCESS AND AN ARRANGEMENT FOR FACSIMILE CODING WITH ADDRESS INSERTION OF A SPECIFIC SURFACE ELEMENT SCANNED FOR TRANSMISSION LIMITING FAULT EFFECTIVENESS UP TO THE NEXT INSERTED ADDRESS

[75] Inventors: Alexander Starck, Munich; Wolfgang Postl, Hoehenrain, both of Germany

[73] Assignee: Siemens Aktiengesellschaft, Berlin & Munich, Germany

[22] Filed: Oct. 22, 1975

[21] Appl. No.: 624,660

[30] Foreign Application Priority Data

Dec. 9, 1974 Germany .................. 2458119

[52] U.S. Cl. .................. 358/263; 178/DIG. 3; 358/264
[51] Int. Cl.² .................. H04N 7/12
[58] Field of Search .............. 178/DIG. 3, 6, 6.8, 178/69.5 F, 69.5 R, 69.5 TV; 340/347 DD

[56] References Cited

UNITED STATES PATENTS

| 3,830,964 | 8/1974 | Spencer | 178/6 |
| 3,927,251 | 12/1975 | White et al. | 178/6 |

*Primary Examiner*—John C. Martin
*Attorney, Agent, or Firm*—Hill, Gross, Simpson, Van Santen, Steadman, Chiara & Simpson

[57] ABSTRACT

In facsimile coding in which the items of information contained on a two-color original consisting of individual surface elements are scanned for transmission, and in which sequence lengths are represented in lines by code words composed of binary characters, and in which a line synchronizing word is produced at the beginning of the coding of each line, address words are inserted after the line synchronizing word after a given number of transmitted binary characters, each address word indicating an address of a specific surface element of a sequence. A coder is provided in a transmitter for producing the code words and a decoder is provided in a receiver for decoding the code words. A first address unit is arranged in the coder which, after each line synchronizing word and after the particular given number of binary characters of the code words, receives the address of the particular next sequence as an address word from a first storage unit which serves to store the sequences assigned to a line and operates to emit the address at the output of the coder. A second address unit is arranged in the decoder which, after each line synchronizing word and after the particular given number of binary characters recognizes the address words and feeds them, as addresses of the particular next sequence, to a second storage unit which contains the colors of the sequences.

9 Claims, 11 Drawing Figures

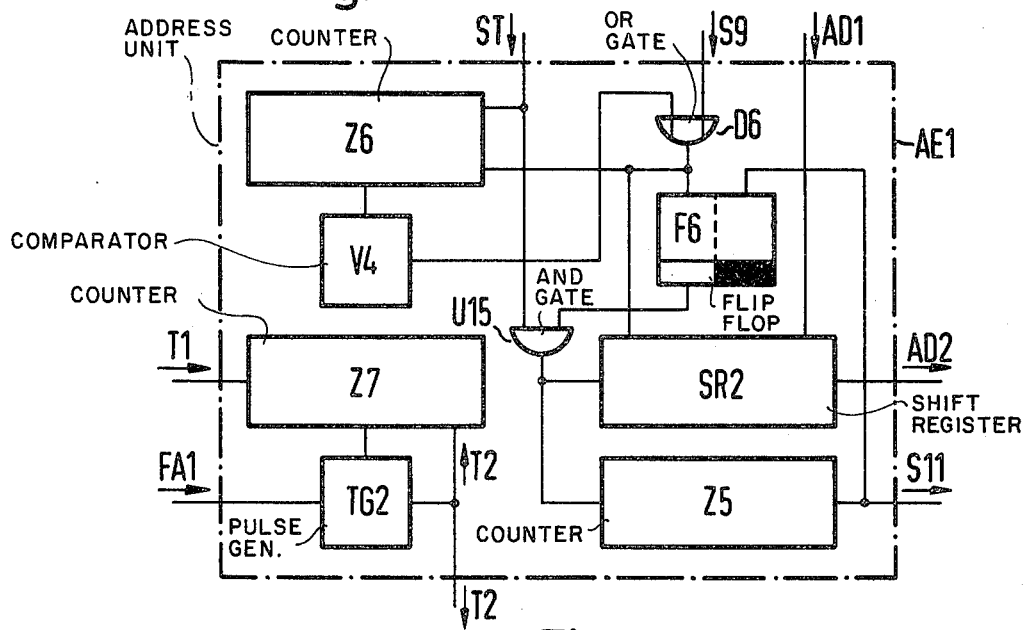
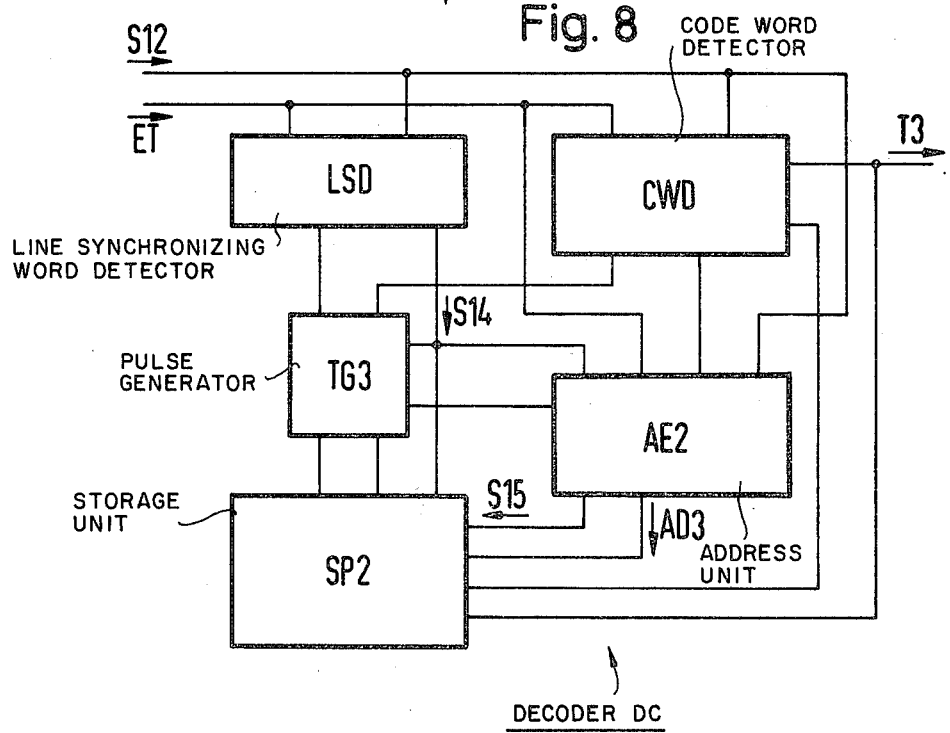

PROCESS AND AN ARRANGEMENT FOR FACSIMILE CODING WITH ADDRESS INSERTION OF A SPECIFIC SURFACE ELEMENT SCANNED FOR TRANSMISSION LIMITING FAULT EFFECTIVENESS UP TO THE NEXT INSERTED ADDRESS

CROSS REFERENCE TO RELATED APPLICATION

This application is related to our United States patent application Ser. No. 624,771, filed Oct. 22, 1975 and assigned to the same assignee as the present invention.

BACKGROUND OF THE INVENTION

1. Field of the Invention

The invention relates to a process and to an apparatus for facsimile coding in which the items of information contained on a two-color original composed of individual surface elements are scanned for the purpose of transmission, in which sequence lengths are represented by code words which consist of binary characters, and in which a line synchronizing word is produced at the beginning of the coding of each line.

2. Description of the Prior Art

The publication by D. Preuss: Redundanzreduzierende Codierung von Faksimilesignalen, Nachrichtetechnische Zeitschrift (Redundancyreducing Coding of Facsimilie Signals, Communications Technological Magazine), Vol. 11 (1971) pp. 564 to 568 has already disclosed a process for coding the lengths of sequences of a first and a second color in facsimile transmission, which process is referred to as sequence length coding. In this process the lines which are to be scanned are broken up into portions of the same color, or brightness, which are referred to as sequences. For each sequence, a code word is produced which indicates the particular number of surface elements, referred to as sequence length, in the form of a dual number. If one code word is not sufficient to represent a sequence length, further code words of the same length are added to this code word.

In the German DAS 2,335,836 another process for coding facsimile signals is disclosed. In this process the length of the code word of a sequence of a specific color is estimated from the length of at least one preceding sequence of the same color. For example, the length of the code word is estimated on the basis of the length of the preceding sequence of the same color in the line currently being scanned and from the length of the adjacent sequence of the same color in the preceding line.

If a code word produced by this known process is transmitted in faulty fashion, the associated sequence length is incorrectly reproduced in the receiver, and the entire following image content is displaced. Faulty transmission has particularly disadvantageous results when a code word has been adjoined by a further code word in order to represent a long sequence and this further code word is not recognized. In this case, the receiver is no longer able to assign the received code words correctly to the sequence lengths for the first color or the second color, as it can no longer recognize which characters form a code word. If, however, a line synchronizing word is provided at the beginning of each line, the effects of the fault can be limited to one line.

The German Published Application 2,264,090 discloses another process for facsimile coding in which, in accordance with a suitable algorithm, the color of each surface element is predicted from the color of a few spots which are already known to the receiver, and in which only those surface elements which have been incorrectly predicted are transmitted as a faulty image, in that the spaces between them are transmitted in a suitable sequence length code with a fixed code table. If, during this process, a sequence length is incorrectly transmitted, generally the remainder of the image content is adulterated.

From the German Published Application 2,031,646 a process is known in which a specific transmission format is used for the transmission of the code words. In accordance with this transmission format, in each case a given number of binary characters, which form the code words, are combined to form a block. Each block is preceded by a synchronization word which consists of a given sequence of binary characters. The synchronization word is followed by an address word which contains the address of the particular next surface element to be scanned, as an absolute address. If a transmission fault occurs, it can happen that, for example, the remainder of the contents of the block will be incorrectly reproduced. However, since the address of the next scanned surface element is transmitted after the next synchronization word, the following block is correctly reproduced.

As, however, the length of a block always contains a given number of binary characters which, for example, is between 256 and 267, in this process a block can extend over several lines. Therefore, the effects of a fault can extend over several lines. The next synchronization word is then transmitted at arbitrary points in a line and the remainder of the line is correctly reproduced from this point onwards. In this process the address words also require a plurality of binary characters as they form an absolute address.

SUMMARY OF THE INVENTION

The object of the invention is to provide a process for facsimile coding in which the effects of faultily transmitted sequences in a sequence length coding process are as small as possible without any essential reduction in the compression factor.

In accordance with the invention, the above object is realized in the process of the type described in the foregoing discussion in that after the line synchronizing word, following a given number of transmitted binary characters, address words are inserted which indicate the address of a specific surface element of a sequence.

The process, in accordance with the invention, has the advantages that fault trails will only affect an entire line in the most unfavorable cases, when the line consists only of one sequence of one color. In all other cases fault trails affect only a part of a line. If, during the transmission of the code words one or more than one binary character is adulterated, then, irrespectively of the type of coding, the fault is effective only up to the next address. In very detailed points of an original at which fault trails are particularly noticeable, the latter are limited to a small zone. If long fault trails occur, they occur in an area of the original which does not have much detail, thus where they are least disturbing.

The process also has the advantage that a fault can be recognized in a simple fashion in that it is checked whether the address indicated by an address word is identical to the address determined from the sum of the previous sequence lengths. If, in this case, a fault is recognized, it is still possible to achieve a good reproduction quality by replacing the zone recognized as faulty by the corresponding zone of the preceding line.

The address words require few binary characters if the address word indicate the address of a surface element within a line as a relative address in relation to the commencement of the particular line.

In order to obviate the necessity of always having to address sequences of a specific agreed color, it is expedient for the address words to contain a binary character which indicates the color of the particular addressed surface element.

A good compression factor is achieved if, after one completely coded sequence, the address of the first surface element of the next but one sequence is indicated by the address word.

Similarly, the compression factor is increased if after each line synchronizing word an address word is produced which indicates the address of the first surface element of the second sequence of a line.

The compression factor is further increased if, after the last but one sequence in a line, the particular next line synchronizing word is transmitted.

An advantageous construction of an arrangement for the execution of the process in which a coder for producing the code words is arranged in a transmitter and a decoder for decoding the code words is provided in a receiver, is achieved by a first address unit which is arranged in the coder and which, after each line synchronizing word and after the particular given number of binary characters of the code words, receives the address of the particular next sequence, as an address word, from a first storage unit which serves to store the sequences assigned to a line and emits the latter at the output of the coder, and is also achieved by a second address unit which is provided in the decoder and which, after each line synchronizing word and after the particular given number of binary characters recognizes the address words and feeds them as addresses of the particular next sequence to a second storage unit which contains the colors of the sequences.

An advantageous construction of the first address unit is achieved if the first address unit contains a first counter which counts a number of transmitting pulse trains assigned to the particular given number of binary characters, and then produces a signal which causes the address word stored in the first storage unit to be written into a shift register and releases the emission of the address word at the output of the coder, and if the first address unit contains a second counter which blocks the emission of the address word after a number of binary characters assigned to the address words.

An advantageous construction of the second address unit is achieved if the second address unit contains a first counter which counts a number of receiver pulse trains which is assigned to the given number of binary characters, and also contains a second counter which, after each line synchronizing word and after the particular given number of binary characters, counts the number of binary characters which is assigned to the address words, and then produces a signal which causes the address words to be transferred as addresses into the second storage unit.

BRIEF DESCRIPTION OF THE DRAWINGS

Other objects, features and advantages of the invention, its organization, construction and operation will be best understood from the following detailed description taken in conjunction with the accompanying drawings, on which:

FIG. 7 is a circuit diagram of a first address unit;

FIG. 8 is a block circuit diagram of a decoder;

DESCRIPTION OF THE PREFERRED EMBODIMENTS

Figure 1:
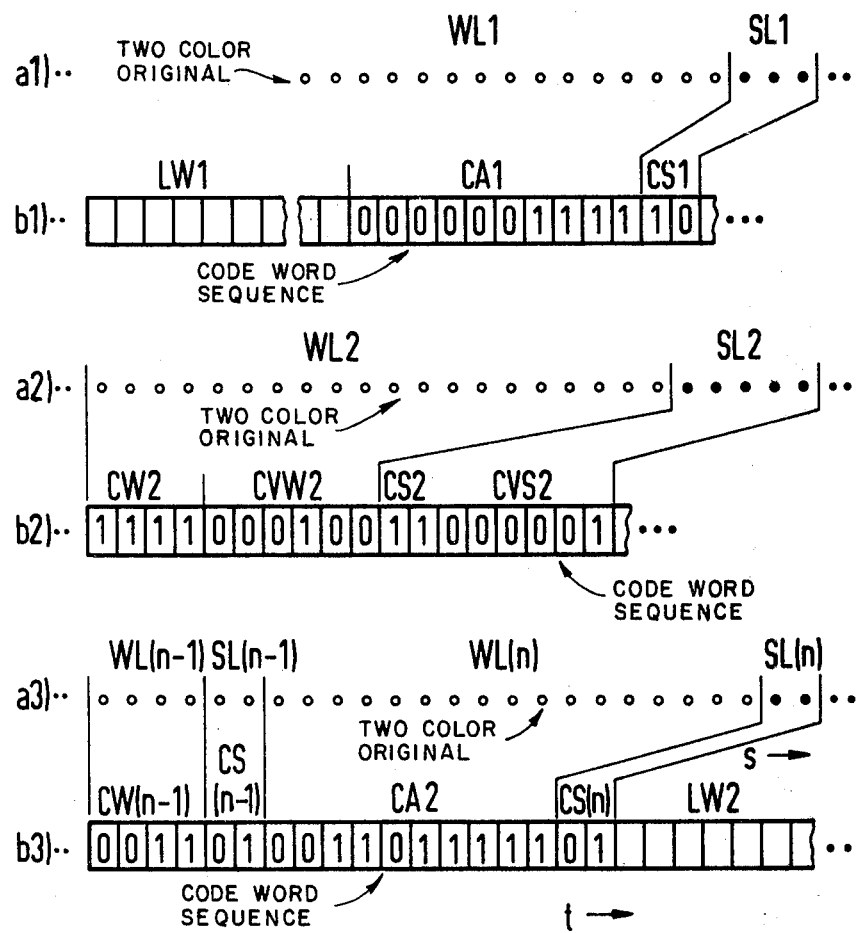
FIG. 1 schematically illustrates a line which is to be scanned and the code words assigned to the various sequences, and also the address words which are gated in between the code words.

The line, represented in rows $a1$ to $a3$ of FIG. 1, of a two-color original scanned line-by-line by a scanning unit is composed of surface elements of a first color and a second color, for example black and white surface elements. The path $s$ traveled over during scanning is represented in the horizontal direction. The surface elements form, alternately, white sequences WL and black sequences SL whose lengths are indicated by the number of white and black surface elements, respectively, and are referred to as sequence lengths. The sequence lengths are represented by first and second code words CW and CS which each consist of a given number of binary characters. The code words CW for the sequence lengths of the white sequences WL are formed from a first number AW of binary characters, and the code words CS for the black sequences SL are formed from a second number AS of binary characters.

There are a number of possible ways of determining the first number AW and the second number AS. For example, from the aforementioned article by D. Preuss, it is known to represent the white sequences WL by in each case AW = 6 binary characters and to represent the black sequences SL by in each case AS = 3 binary characters. If the numbers AW and AS are not sufficient to code a sequence length, further code words with the relevant number AW or AS are added.

From the German DAS 2,335,836, also referred in the introduction, it is also known to estimate the numbers AW and AS from the sequence lengths of horizontally or vertically adjacent sequences of the same color.

To represent the possible codings, in the following an application of the process for codes, in accordance with the invention, will be described in which the code words for white sequences contain AW = 4 binary characters and those for black sequences contain AS = 2 binary characters. If the code words CW and CS are not sufficient to code the sequence lengths, third code words CVW or CVS are added whose number AV of binary characters is equal to the sum of the numbers AW and AS. In the code the sequence lengths which have been reduced by one surface element are represented in the form of dual numbers by the code words.

Rows $b1$ to $b3$ illustrate an exemplary sequence of code words CW, CS, CVW, CVS, such as are formed in the code of the line represented in rows a1 to a3. The time $t$ is shown in the horizontal direction.

At the beginning of each line the code words are preceded by a line synchronizing word LW1 which forms a receiver that a new line is commencing. Immediately after the line synchronizing word LW1, the address of the first surface element of the first black sequence SL1 of the line is transmitted as address word CA1. The address word CA1 has a length which is equal to the sum of the number AW and a whole numbered multiple of the sum of the numbers AW and AS and, for example, is equal to 10. In the scanning line represented in row a1, the first white sequence WL1 which consists of 14 white surface elements is followed by the first black surface element, the address 15 of which is thus represented as dual number 0000001111 by the address word CA1. Then the first black sequence SL1 which has a sequence length of three surface elements is represented by the dual number 10 as code word CS1. The next white sequence WL2 has a sequence length of 20 surface elements. However, with the four binary characters of the code word CW it is only possible to represent sixteen surface elements. In this case the number $2^{AW}-1$ which consists solely of binary 1's is represented in the form of a dual number as code word CW2. Then a code word CVW2 is formed which represents the sequence length reduced by 16. In the represented example the code word CVW2 contains the dual number 000100.

Then the code word CS2 for the next black sequence SL2 is formed, which has a sequence length of five surface elements. The code word CS2 is again insufficient to represent the entire black sequence SL2. In this case, similarly as in the case of the white sequence WL2, the number $2^{AS}-1$ is represented in the form of a dual number as code word CS2 and then the sequence length, reduced by four, is represented by a code word CVS2. If the code words CVW and CVS are still insufficient to represent the corresponding sequence lengths, these are formed solely from binary 1's and are adjoined by further code words CVW and CVS, respectively.

The sequence lengths of the following white and black sequences WL(n - 1) to SL (n) are represented in a similar fashion. After a given number AA of binary characters which is equal to a whole-numbered multiple of the sum of the numbers AW and AS another address word CA2 is transmitted. Because of the selected numbers AW and AS in most cases a code word CS will be ended directly before the beginning of an address word. In this case, as shown in rows a3 and b3, the address e.g. 223 of the first surface element of the black sequence SL (n) is transmitted by the address word CA2. Then the sequence length of the black sequence SL (n) is transmitted by the code word CS (n). The white sequence WL (n) has not been represented. Similarly, the address of the first surface element of the next black sequence is transmitted when a code word CVW is interrupted by an address word. If, however, a code word CVS is interrupted by an address word, the address of the last surface element to have been represented is transmitted to this surface element following the address word in the manner of an independent black sequence. The addressed black surface element must also be included in order that this sequence cannot have the length O.

As soon as the last black sequence SL (n) of the scanning line has been represented by a code word CS (n), the next line synchronizing word LW2 is transmitted. It is therefore ensured that the last sequence of a scanning line is always black.

Due to the addressing of the first black sequence and the omission of the last white sequence in a line, the compression factor is increased as in most backgrounds a white border is provided on the left-hand side and the right-hand side.

Figure 2:
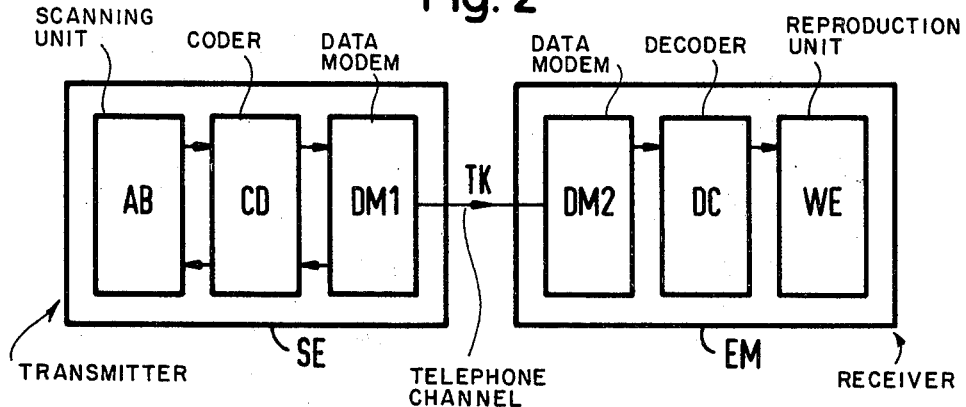
FIG. 2 is a block circuit diagram of an arrangement for facsimile transmission.

The arrangement for facsimile transmission represented in FIG. 2 consists of a transmitted SE and a receiver EM. The transmitter SE contains a scanning unit AB in this the original which is to be transmitted is scanned line-by-line. The white and black sequences are transmitted in the form of binary signals to a coder CD. The coder CD produces the code words assigned to the sequences which it emits to a data modem DM1. From the data modem DM1 the code words are transmitted, for example via a telephone channel TK, to another data modem DM2 in the receiver EM. The data modem DM2 is followed by a decoder DC which, from the transmitted code words, produces control signals for a reproduction unit WE in which the transmitted original is reproduced.

Figure 3:
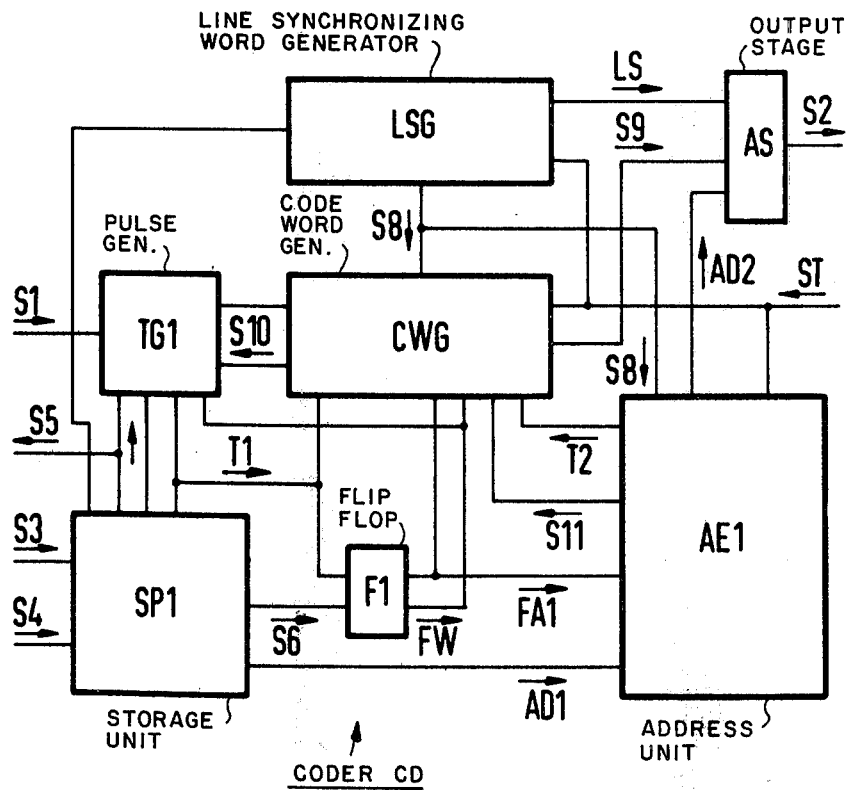
FIG. 3 is a block circuit diagram of a coder.

The coder CD illustrated in FIG. 3 is supplied with a start signal S1 which is emitted from the scanning unit AB and which triggers the production of the line synchronizing word. Under the control of a transmitting pulse train ST emitted by the data modem DM1, the line snchronizing word is fed from a line synchronizing word generator LSG via an output stage AS as a signal S2 to the data modem DM1. After the start signal S1, the scanning unit AB emits the binary signals S3 which represent the white and black sequences and also provides associated timing pulses S4 to a storage unit SP1. When the binary signals S3 assigned to a line have been transmitted in full, the storage unit SP1 emits a stop signal S5 to the scanning unit AB. This stop signal S5 simultaneously releases a pulse generator TG1. With the timing pulses T1 emitted from the pulse generator TG1, the binary values of the binary signals S3, which are stored in the storage unit SP1, are read out. As soon as a color change occurs during the read-out of the contents, a flip-flop F1 is triggered and the pulse generator TG1 is blocked by a color signal FA1.

In an address unit AE1, on the occurrence of the first black sequence SL1 of a line, the address of that storage cell which contains the binary value of the binary signal S3 assigned to this sequence is stored in the storage unit SP1. After the transmission of the last binary character of the line synchronizing word, this address is emitted as an address word CA1 via the output stage AS. Meanwhile, the pulse generator TG1 is released again and the contents of the storage unit SP1 is read out again until the next color change.

A code word generator CWG produces a code word which is assigned to the length of the read-out sequence. When the address word CA1 has been transmitted, this code word is called up by the transmitting pulse train ST and likewise fed via the output stage AS to the data modem DM1. Simultaneously, the next white sequence WL2 is coded, etc.

After a given number AA of, e.g. 102 binary characters, of the code words, another address word is transmitted in a similar manner to that in which the address word CA1 has been produced and emitted, in order to limit trails to just a small region of the original. The address words contain no absolute addresses but relative addresses relating to the beginning of the particular line.

When the content of the storage unit SP1, assigned to a line has been read out, the pulse generator TG1 is again blocked and the binary signals S3 associated with the sequences of the next line are transmitted from the scanning unit AB to the storage unit SP1. After the transmission of the next line synchronizing word, the code words of the next line are produced in a similar manner.

Further details of the coder CD will be described together with the circuit diagrams represented in FIGS. 4 to 7.

Figure 4:
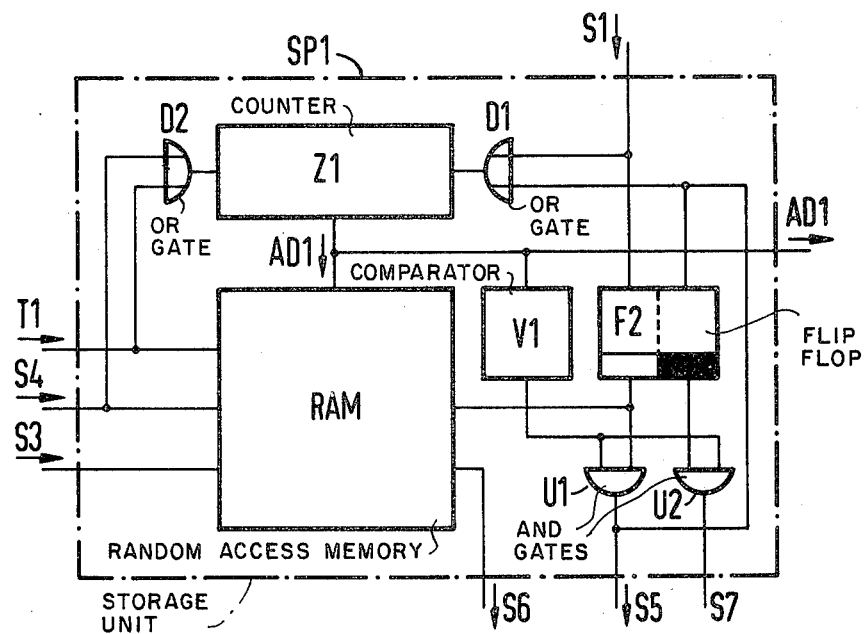
FIG. 4 is a block circuit diagram of a storage unit.

In the storage unit SP1 represented in FIG. 4, the start signal S1 is conducted to a flip-flop F2, and, via an OR gate D1, to a counter Z1. The start signal S1 resets the flip-flop F2 and the counter Z1. The signal at the output of the flip-flop F2 prepares a write-in/read-out random access memory, the store RAM, consisting of a commercially available module for the write-in of the binary values of the binary signals S3. Then the scanning unit AB emits the binary signals S3 and the associated timing pulses S4. These timing pulses S4 are conducted both to the store RAM as write-in commands and also via an OR gate D2 to the counter Z1. Each timing pulse S4 advances the counter Z1 which indicates the address of that write-in cell in which the corresponding binary value of the binary signal S3 is written in. When the line has been input in full, a comparator V1, which compares the contents of the counter Z1 with a value assigned to the length of a line, emits the stop signal S5 via an AND gate U1. The stop signal S5 resets the flip-flop F2 and the counter Z1. The signal at the output of the flip-flop F2 then prepares the store for read-out.

With the aid of the timing pulses T1 the contents of the store RAM is read-out for the production of the code words. The signal S6 at the output of the store RAM is conducted to the flip-flop F1 which is triggered with every color change. When all the binary values of a line have been read-out, the comparator, via an AND gate U2, emits a signal S7 which blocks the pulse generator TG1 and restarts the scanning unit AB.

When the signal S4 occurs before the last binary character of the line synchronizing word has been emitted, it causes a renewed production of a line synchronizing word, as in this case the line consists only of one single white sequence.

Figure 5:
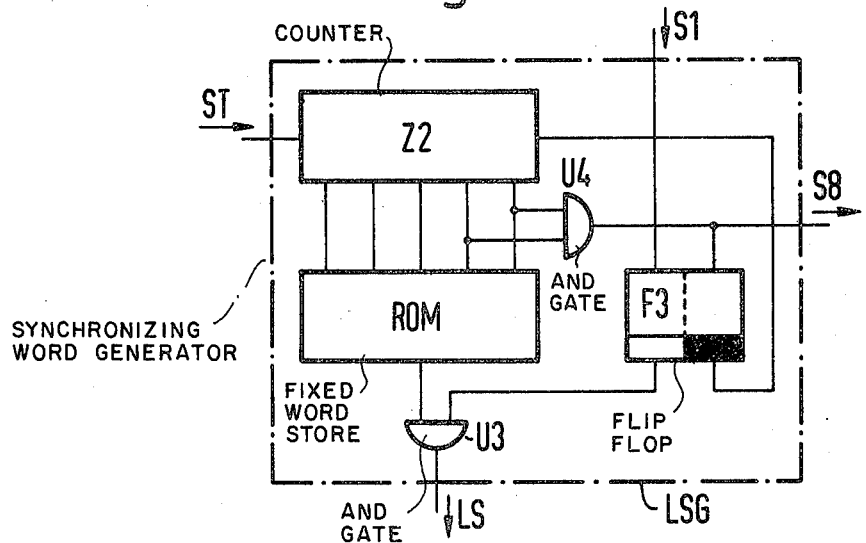
FIG. 5 is a circuit diagram of a line synchronizing word generator.

The synchronizing word generator LSG represented in FIG. 5 is likewise supplied with the start signal S1. At the beginning of each line a flip-flop F3 is set with the start signal S1. With each transmitting pulse train a counter Z2 is caused to count upwards and its contents serves as address for a fixed word store ROM. At the output of the fixed word store ROM, the line synchronizing word is emitted in serial fashion as signal LS via an AND gate U3. The signal consists of, for example, an agreed sequence of twenty four binary characters. An AND gate U4 checks whether the two highest value position of the counter Z2 receive the binary value 1 and whether the count of twenty four has been reached. When this is so, the flip-flop F3 and the counter Z2 are reset. At the same time a signal S8 is emitted to indicate the end of the line synchronizing word.

Figure 6:
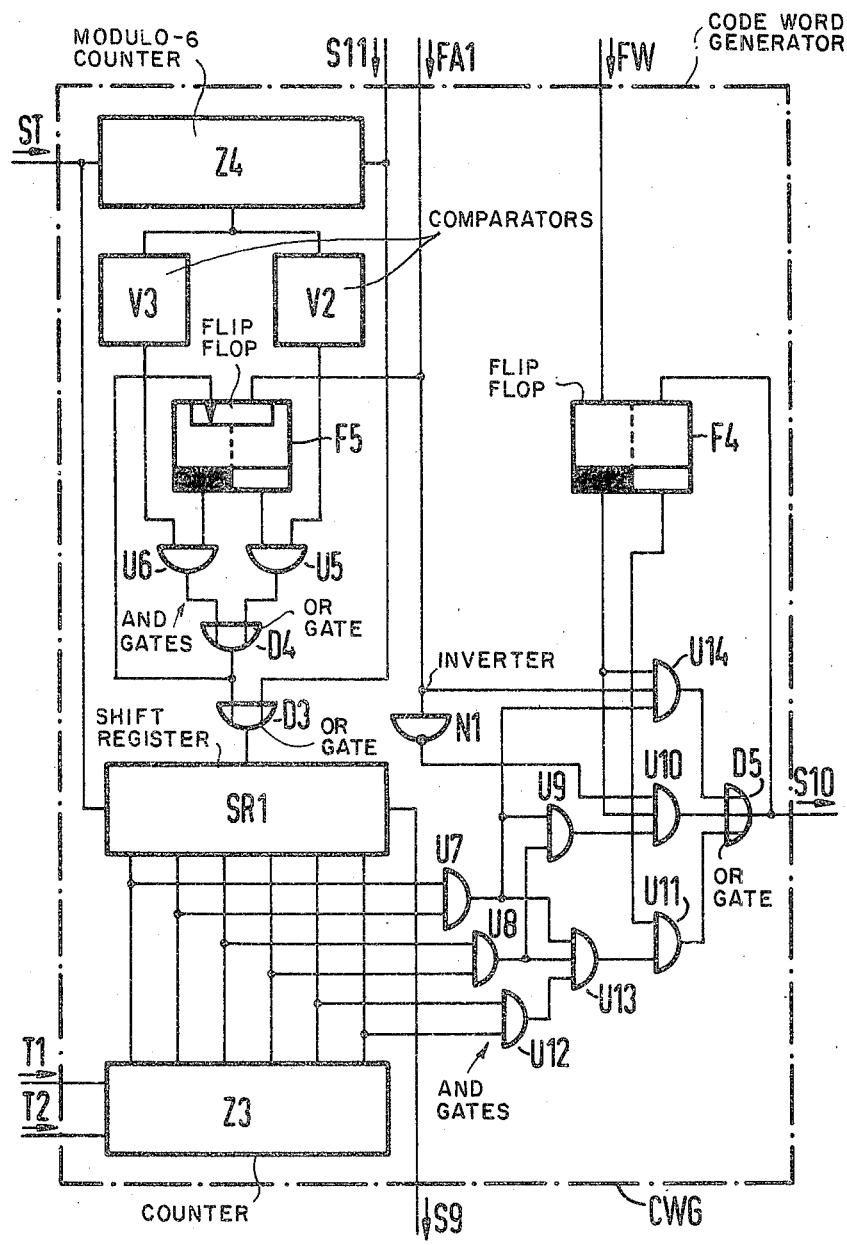
FIG. 6 is a circuit diagram of a code word generator.

The code word generator CWG illustrated in FIG. 6 is supplied with the timing pulses T1 and with other pulses T2, the number of which is proportional to the relevant sequence length. The timing pulses are counted in a counter Z3. After the first timing pulse, the counter assumes the count zero. When, as in FIG. 1, the first black sequence SL1 has the sequence length 3, the counter Z3 has the count 2 at the end of the sequence. At the beginning of the white sequence WL2, the pulse generator TG1 is blocked and a signal FW which indicates every color change, resets a flip-flop F4. The signal FA1, which indicates the color of the sequence which is currently to be coded, still has the binary value 1. After the end of the address word, the modulo-6 counter Z4 is set at the count 4 with a signal S11. At the same time, via an OR gate D3, the write-in of the count 2 into a shift register SR1 is triggered. As the counter Z4 has the count 4, a comparator V3, which checks whether the count is 4, emits a signal via an AND gate U6 and an OR gate D4 to set a flip-flop F5. Then the transmitting pulse train ST shifts the code word CS1 out of the shift register SR1 and transmits it as a signal S9 to the output stage AS, while the pulse generator TG1 is simultaneously released.

At the same time, the length of the next white sequence WL2 is also determined in the counter Z3. As this sequence has the sequence length 20, when the counter Z3 has reached the count 15, the binary value 1 is emitted at the output of the AND gates U7 to U9. As the binary value 1 is also present at the output of an inverter I1, via an OR gate D5 the AND gate U10 emits a signal S10 which indicates an overflow of the code word CW2. This signal causes a blockage of the pulse generator TG1 until the code word CW2 has been determined.

The signal S10 sets the flip-flop F4 and releases an AND gate U11. After two transmitting pulse trains ST, the counter Z4 again reaches the count 0 and the contents of the counter Z3 is again transferred into the shift register SR1 and the flip-flop F5 is reset. The count 0 is recognized by a comparator V2 which emits a corresponding signal via an AND gate U5 and the OR gate D4 to the shift register SR1 and to the flip-flop F5. Then the code word CW2 is emitted and the remainder of the white sequence WL2 is coded. When the counter Z4 has again reached the value 4, the code word CVW2 which contains the remainder of the white sequence WL2 is written into the shift register SR1. As the color of the sequence has not changed at this time the flip-flop F5 is not triggered. After two transmitting pulse trains ST the counter Z4 again reaches the count 0, but the signal emitted from the comparator V2 is blocked by the AND gate U5. After another four transmitting pulse trains ST, the counter Z4 again reaches the count 4 and the code word CS2 assigned to the next black sequence SL2 is input into the shift register SR1. If the further code word has not been sufficient to code the white sequence, another signal S11 would have been produced via the AND gates U11 and U13 and would have caused the production of another code word. The black sequence SL2 is coded in a similar manner to the white sequence WL2. In this case an overflow is recognized by the AND gate U14 and the flip-flop F5 remains set so that after the code word CS2 the further code word CVS2 can be taken up at the count of 0.

After the end of the line synchronizing word LW1, the signal S8 is conducted to the address unit AE1 represented in FIG. 7. This signal S8 sets a flip-flop F6 and writes into the shift register SR2 the instantaneous address AD1 contained in the counter Z1 of the storage unit SP1. Then the address is read-out of the shift register SR2 in serial fashion with the aid of the transmitting pulse trains ST and is transmitted as a signal AD2 representing the address word CA1, to the output stage AS.

A counter Z5 counts the transmitting pulse trains ST and after ten transmitting pulse trains ST, when the address has been emitted in full, emits a signal S11 which resets the flip-flop F6 and blocks the continued emission of transmitting pulse trains ST by an AND gate U15. The production of the code words is initiated at the same time. With the signal S8 a counter Z6, which counts the transmitting pulse trains ST between two gated-in addresses, is reset. If, for example, the address words are to be gated in at intervals of AA = 102 characters, a comparator V4 which compares the count with 102 emits, via an AND gate D6, a signal which causes an address word to be gated in, in the same way as the signal S8. During the gating in of the address word, the production of the code words is blocked.

The address unit AE1 also contains another counter Z7 which counts the length of the white sequences as these must be established before the address words are produced. If a white sequence is coded, its length is stored in the counter Z7. At the beginning of the following black sequence, a pulse generator TG2 is released which emits timing pulses T2 which are conducted to the code word generator CWG instead of the timing pulses T1, The timing pulses T2 causes the counter Z7 to count backwards until it has reached the count 0. When this has occurred, it again blocks the pulse generator TG2 and conducts the timing pulses T1 to the code word generator CWG in order to code the next black sequence.

The decoder DC represented in FIG. 8 is supplied via the data modem DM2 with the transmitted signals S12. A detector LSD for the line synchronizing word checks whether the sequence of binary characters is identical with the agreed line synchronizing word. If this is so, a code word decoder CWD is released. The code words are decoded and the signals assigned to the black and white sequences are stored in a storage unit SP2. Whenever one sequence of a line has been decoded, a signal S13 and associated timing pulses T3 are fed to the reproduction unit WE. Also provided is another address unit AE2 which recognizes the occurrence of an address word and then loads this address word, as an address, into an address counter of the storage unit SP2. This address serves to address the next black sequence in the storage unit SP2.

Further details of the decoder DC will be described together with the circuit diagrams shown in FIGS. 9 to 11.

Figure 9:
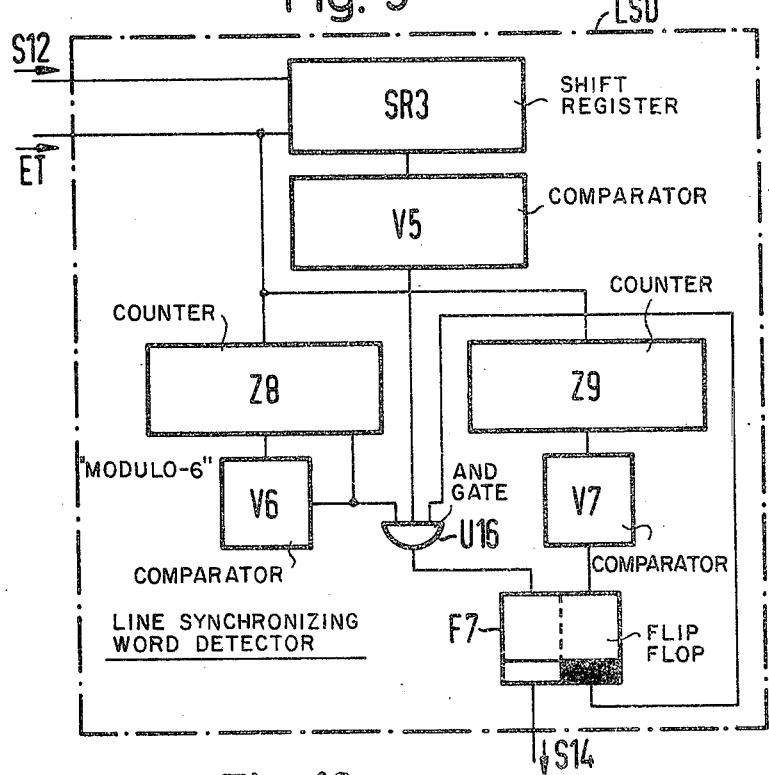
FIG. 9 is a circuit diagram of a line synchronizing word detector.

In the synchronous word detector LSD represented in FIG. 9, the signal S12 emitted by the data modem DM2 is written into a shift register SR3 with an associated receiver pulse train ET. The parallel outputs of the the shift register SR2 are connected to a comparator V5 which compares the particular contents of the shift register with the sequence of binary characters which has been agreed upon as line synchronizing word. A modulo-6 counter constructed from a counter Z8 and a comparator V6 in each case emits a pulse after six receiver pulse trains ET at the count 0. A counter Z9 counts the number of binary characters of the line synchronizing word. When the counter Z9 has reached the count 24, it resets a flip-flop F7. The signal at the inverted output of the flip-flop F7 resets the counter Z9 and releases an AND gate U16. If the comparator V5 establishes identity and the comparator V6 emits a pulse, the line synchronizing word is recognized and the flip-flop F7 is set. At the output of the flip-flop F6 a signal S14 is emitted which is conducted to the pulse generator TG3 and to the address unit AE2.

Figure 10:
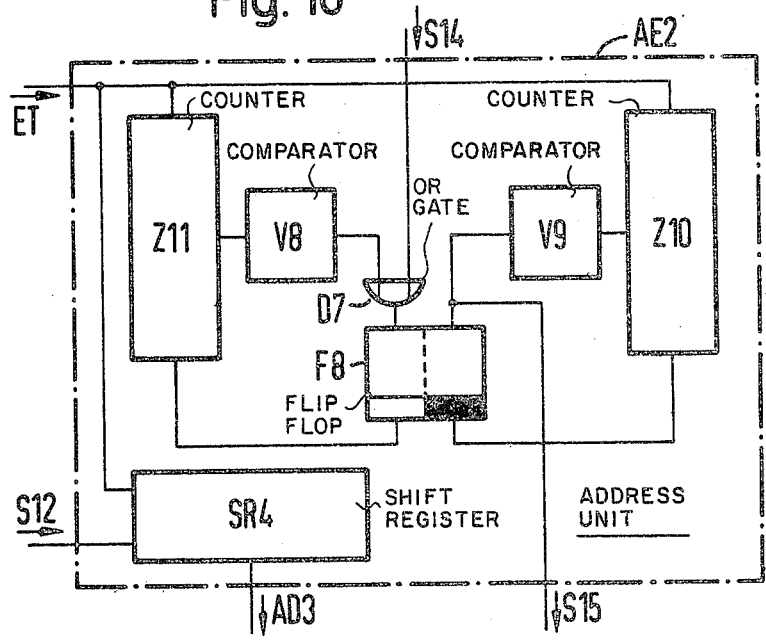
FIG. 10 is a circuit diagram of a second address unit.

The address unit AE2 represented in FIG. 10 is likewise supplied with the signal S11. The binary values of this signal are input into a shift register SR4 with the aid of the receiver pulse train ET. When the line synchronizing word has been found, via an OR gate D7 the signal S14 sets a flip-flop F8 and a counter Z10 is released. As the address word CA1 consists of ten binary characters, when the count 10 is reached a comparator V9 emits a signal S15. This signal S15 is fed to the storage unit SP2 and causes the contents of the shift register SR4 to be input in parallel, as an address, into the counter for the address of the storage positions in the storage unit SP2. The storage unit SP2 is of similar construction to the storage unit SP1 and likewise contains a write-in/read-out store RAM, a counter and switching elements for controlling the read-out and write-in operations.

The signal S15 also resets the flip-flop F8 and the counter Z10. As the address words are inserted between the code words at intervals of, e.g. 102 binary characters, after an interval of 102 binary characters the contents of the shift register SR4 must be written into the counter of the storage unit SP2. A counter Z11, which is supplied with the receiver pulse trains ET, is followed by a comparator V8 which, at the count 102, emits, via the OR gate D7, a signal which sets the flip-flop F8. Similarly, as in the case of the signal S14, the counter Z11 is released, another ten binary characters are counted, and, with the signal S15, the address is again transferred as signal AD3 into the storage unit SP2. On the setting of the flip-flop F8 the counter Z11 is again reset.

Figure 11:
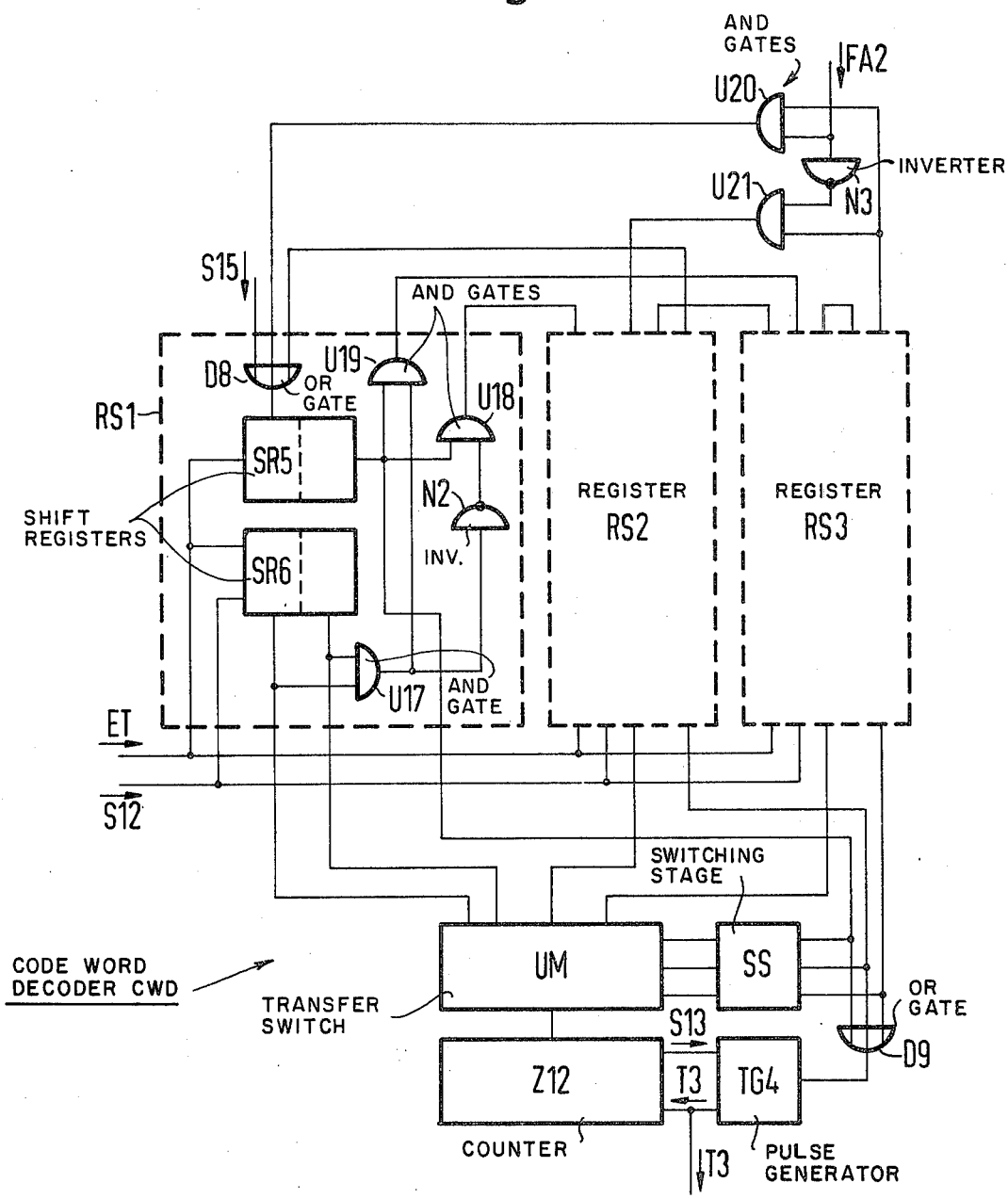
FIG. 11 is a circuit diagram of a code word decoder.

The code word decoder CWD shown in FIG. 11 contains three register circuits RS1 to RS3 of similar construction. The register circuit RS1 contains two two-stage shift registers SR5 and SR6, an OR gate D8, three AND gates U17 to U19 and an inverter N2. The register circuits RS2 and RS3 differ from the register circuit RS1 only in that instead of the two-stage shift registers, they possess four-stage and six-stage registers.

The first code word to follow the line synchronizing word and the address word CA1 is the code word CS1 for the black sequence. With the signal S15 and on the occurrence of the first receiver pulse train ET, the first position of the shift register SR5 is set. At the same time code word CS1 is written into the first position of the shift register SR6. With the next receiver pulse train ET, the code word CS1 is fully transferred into the shift register SR6 and the binary value 1 in the shift register SR5 is shifted into the second position. As now the binary value 1 appears at the output of the shift register SR5, via a switching stage SS a transfer switch UM is controlled in such manner that the parallel outputs of the shift register SR6 are connected to the parallel inputs of a counter Z12. At the same time in a pulse generator TG4 a pulse is produced which transfers the contents of the shift register SR6 into the counter Z12. Then, further pulses T3 are emitted which cause the counter Z12 to cound downwards until the count of -1 is reached. Then the pulse generator TG4 is blocked with a signal S13. While the counter Z12 is counting downwards the pulses T3 are also conducted to the storage unit SP2.

As the code word CS1 does not consist of the binary characters 11, via the AND gate U17 and the inverter N2 and the AND gate U18 is released which in similar fashion sets the first stage of the first shift register in the register circuit RS2. Then, the code word CW2 is input into the second shift register and then transmitted to the counter Z12. Subsequently, the counter Z12 is again caused to count downwards.

As the code word CW2 consists only of binary character 1's, in the register stage RS2 an AND gate corresponding to the AND gate U19 is released and the first stage of the shift register in the register circuit RS3 is set in order to decode the code word CVW2. The code word CVW2 is input into the second shift register of the register circuit RS3 and is then transmitted to the counter Z12.

Then the code word CS2 is decoded. As this is a black sequence, the color signal FA2 possesses the binary value 1. Thus, the OR gate D8 is operated again via the AND gate U20.

As a white sequence is decoded again after the code word CVS2, the color signal FA2 which has been inverted by the inverter N3 releases the AND gate U21 and the first stage of the shift register in the register circuit RS2 is set. On the reception of the next line synchronizing word, the contents of the store in the storage unit SP2 is emitted to the reproduction unit WE and the store is reset.

Although we have described our invention by reference to a particular preferred embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a process for facsimile coding in which the items of information contained on a two-color original consisting of individual surface elements are scanned for the purpose of transmission, in which sequence lengths are represented in lines by code words composed of binary characters, and in which a line synchronizing word is produced at the beginning of the coding of each line, the improvement therein comprising the step of:
   inserting address words which indicate an address of a specific surface element of the sequence after the line synchronizing word after a given number of transmitted binary characters.

2. The improved process set forth in claim 1, wherein the step of inserting address words is further defined as inserting address words to indicate the address of a surface element within a line as a relative address in relation to the beginning of the particular line.

3. The improved process set forth in claim 2, wherein the step of inserting address words is further defined as inserting address words which contain a binary character which indicates the color of the particular addressed surface element.

4. The improved process set forth in claim 1, wherein the step of inserting address words is further defined as inserting address words in which, after one fully coded sequence, the address of the first surface element of the next but one sequence is, in each case, indicated by the address word.

5. The improved process set forth in claim 1, comprising the step of producing an address word after each line synchronizing word to indicate the address of the first surface element of the second sequence of a line.

6. The improved process set forth in claim 1, comprising the step of transmitting the next line synchronizing word after the last but one sequence of a line.

7. An arrangement for facsimile coding in which the items of information contained on a two-color original consisting of individual surface elements are scanned for the purpose of transmission, in which sequence lengths are represented in lines by code words composed of binary characters, and in which a line synchronizing word is produced at the beginning of the coding of each line, and wherein after the line synchronizing word after a given number of transmitted binary characters, address words are inserted to indicate an address of a specific surface element of a sequence, comprising:
   a transmitter including a coder for producing the code words;
   a receiver including a decoder for decoding the code words;
   a first storage unit for storing sequences assigned to a line;
   a first address unit in said coder operable, after each line synchronizing word and after a particular given number of binary characters of the code words, to receive the address of the particular next sequence as an address word from said first storage unit and emit said address at the output of said coder;
   a second address unit in said decoder operable, after each line synchronizing word and after the particular given number of binary characters, to recognize the address words and output the same as addresses of the particular next sequence; and
   a second storage unit connected to said second address unit and containing the color of the sequences.

8. The arrangement set forth in claim 7 comprising:
   a first counter in said first address unit;
   a second counter in said first address unit; and
   a shift register in said coder,
   said first counter operable to count a number of transmitting pulse trains assigned to the given number of binary characters and produce a signal which causes the address word stored in said first storage unit to be written into said shift register and which releases the emission of the address word at the output of said coder,
   said second counter operable after a number of binary characters assigned, in each case, to the address words, to block the emission of the address word.

9. The arrangement set forth in claim 7, wherein said second address unit comprises a first counter which is operable to count a number of receiver trains which is assigned to the given number of binary characters, a second counter which is operable after each line synchronizing word and after the given number of binary characters to count the number of binary characters which is assigned to the address words and produce a signal which transfers the address words as addresses to said second storage unit.

* * * * *